Patented Feb. 19, 1952

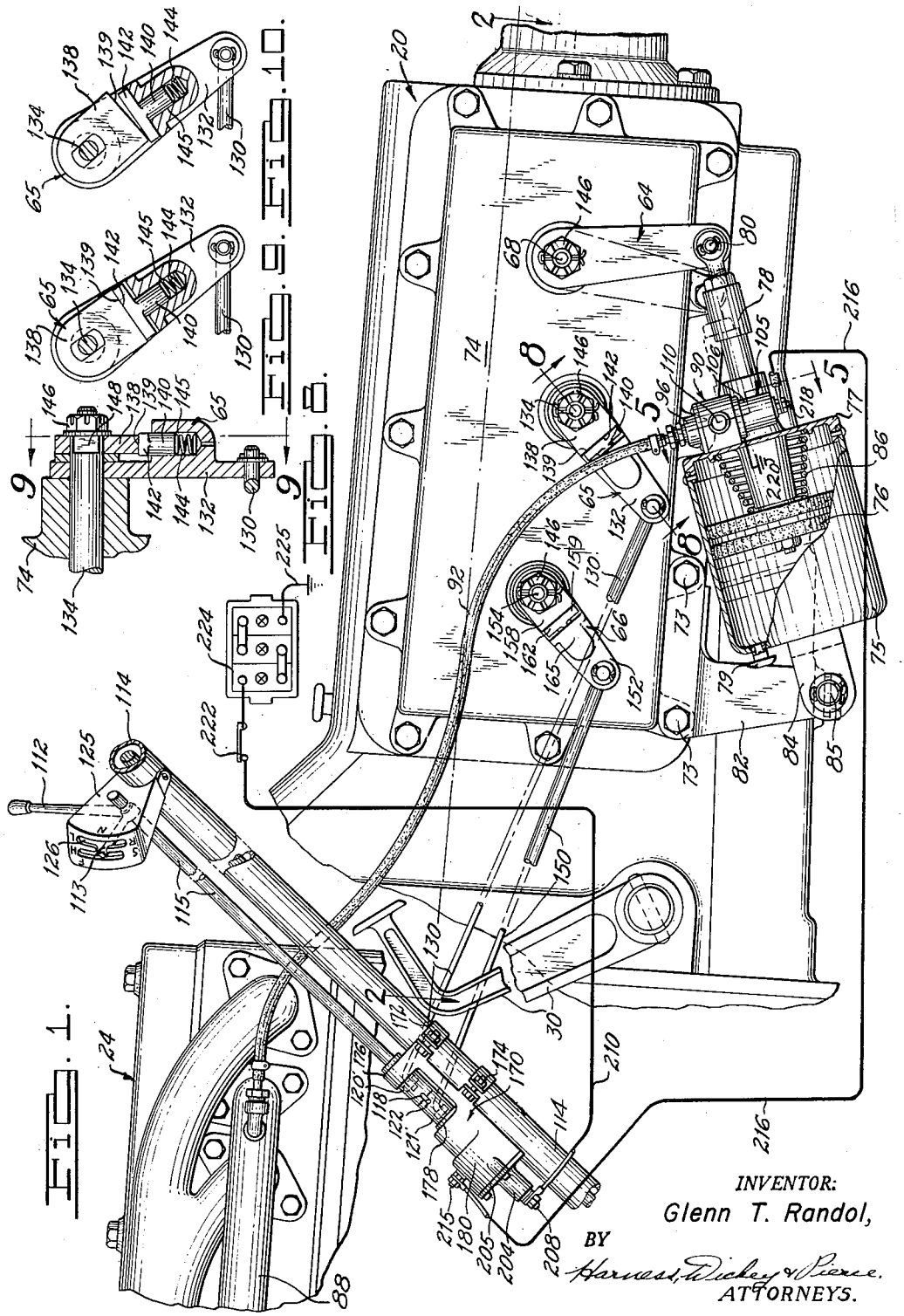

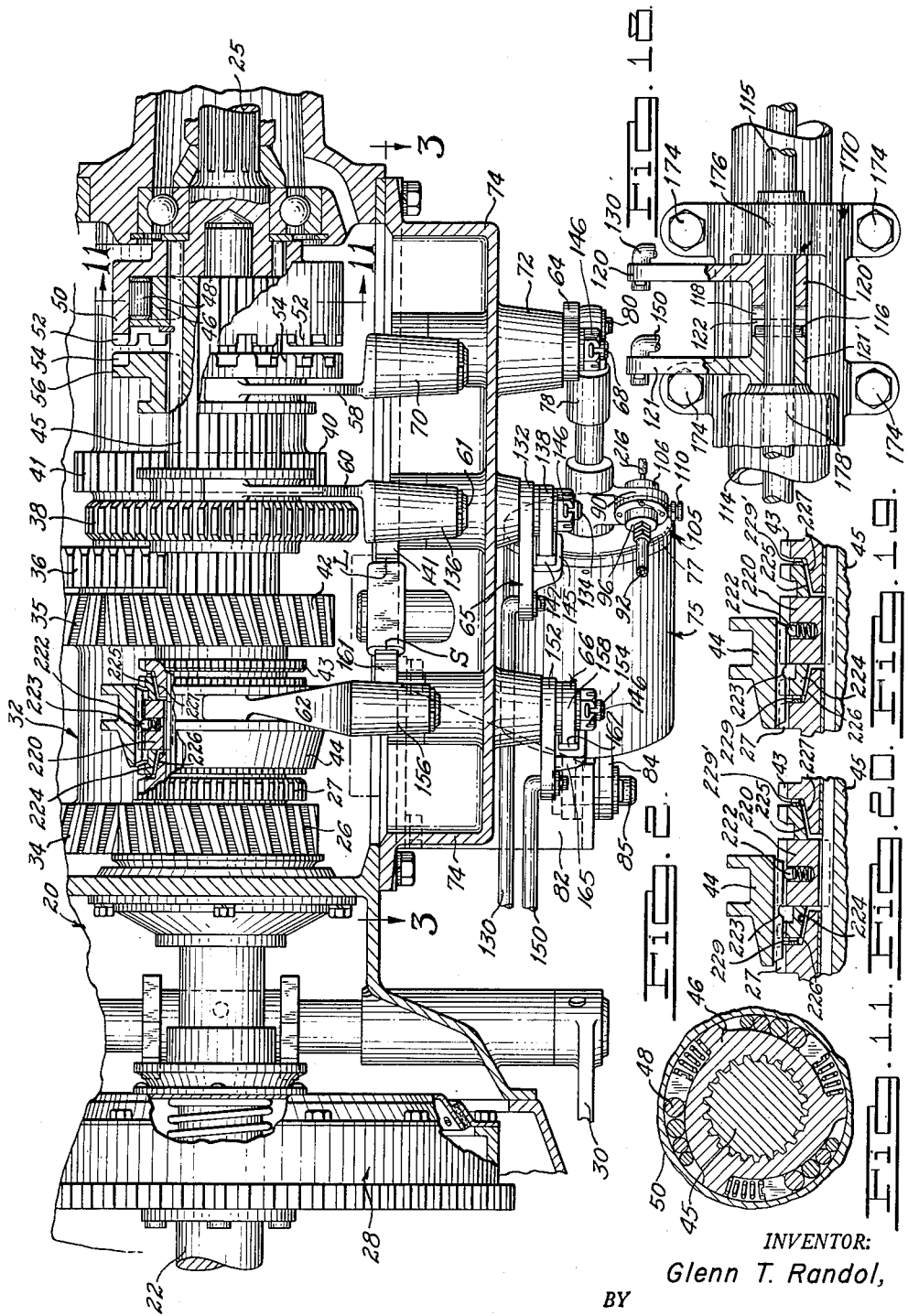

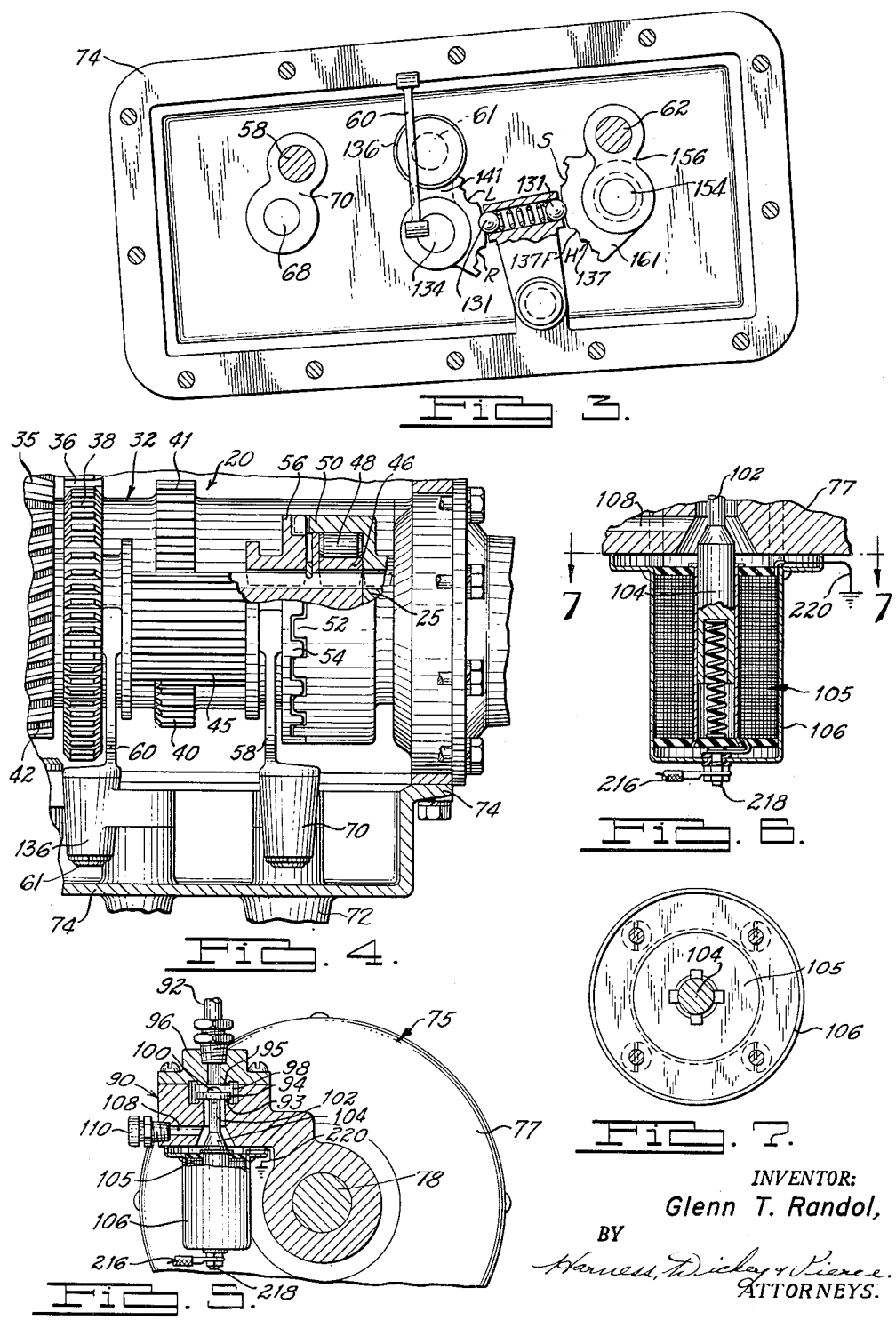

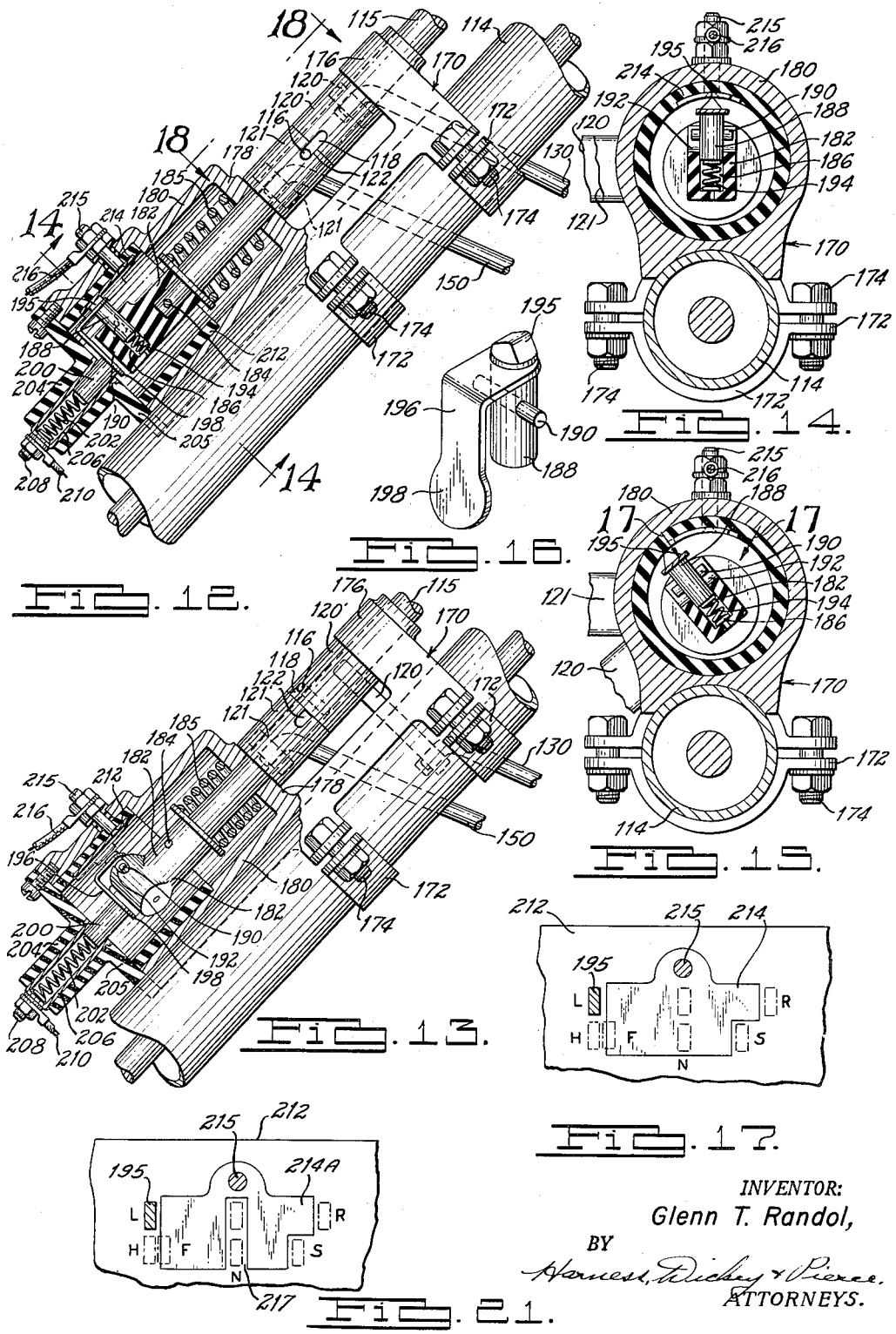

2,585,964

UNITED STATES PATENT OFFICE 2,585,964

AUTOMOTIVE VARIABLE-SPEED AND DRIVE POWER TRANSMISSION

Glenn T. Randol, St. Louis, Mo.

Application October 4, 1946, Serial No. 701,193

17 Claims. (Cl. 74—340)

The present invention relates to change speed gear transmissions, particularly for automotive vehicles, and is especially concerned with control systems for regulating the torque and gear ratio of the drive through such transmissions, and for selectively converting an established speed of the transmission into either a positive two-way or free-wheeling drive at will.

The primary aim of the invention is to provide an improved and simplified transmission control system of reliable and inexpensive character, incorporating shiftable ratio-changing means and novel automatically operable torque-relieving clutch means so arranged and interrelated that when the vehicle is in motion the shiftable means is freely movable to change the driving ratio and selectively the "drive"; i. e., positive two-way or one-way freewheeling, without requiring the driver to manipulate a main clutch or any other associated mechanism other than to control the speed of the engine.

It is also an important object of the present invention to provide an improved control mechanism of the indicated character requiring little change from present-day standardized practice in the design and manufacture of automotive transmissions and transmission control mechanism, the changes necessitated in order to achieve the benefits of the invention being of an inexpensive character, well adapted to mass production methods, inherently reliable and long lived in character, yet readily and conveniently accessible for any servicing, adjustment or replacement which may become necessary. Thus in the preferred exemplification of the invention herein disclosed, the transmission components conform to current standard practices, and the shifting mechanism includes a hand-control lever arranged and operable in the manner now standardized by the motorcar manufacturers. The adaptability of my invention to such standardized designs and practices will be recognized as one of its important advantages.

Another object of the invention is to provide an improved control system for a transmission incorporating an overrunning clutch in the line of drive, the invention also including improved control means for the overrunning clutch so arranged that the overrunning clutch may be maintained in operative condition to provide a freewheeling drive through a selected driving ratio of the transmission whenever the operator desires, yet is immediately and automatically locked up in event of stalling of the engine, and is always continuously locked up while the engine is not running, to provide positive two-way engine braking at such times.

As object related to that last stated is to incorporate an improved freewheeling system and freewheeling control feature of the indicated character which does not interfere with conventional operation of the transmission and which involves no special or accessory control devices requiring manipulation by the driver, which is at all times fully under the control of the driver, which may readily be incorporated or omitted, as the manufacturer may decide, and which, if incorporated, entails only minor structural changes of negligible cost.

Still another object is to provide an improved motor vehicle power-drive system incorporating a friction clutch, a change-speed gear transmission and a control system for the transmission, including an overrunning clutch for relieving the torque load upon the transmission parts during actuation of the control system to shift speeds, thereby enabling such shifting without disengagement of the friction clutch, means for locking up the overrunning clutch to provide a positive two-way drive at all times except during actuation of the control system, and means whereby the same overrunning clutch and the same control system may selectively be employed at will to provide a freewheeling drive.

Other objects and advantages will become apparent upon consideration of the present disclosure in its entirety.

In the drawings:

Figure 1 is a partly diagrammatic view, principally in side elevation but partly in nonlinear perspective, showing a transmission provided with control means arranged and constructed in accordance with the present invention, fragmentarily illustrating an associated engine, steering column, and actuating means for the coupling or friction clutch, the transmission and parts directly carried thereby being shown upon a larger scale than the remainder of the figure;

Figure 2 is a fragmentary, horizontal sectional plan view, with parts broken away, taken substantially upon the line 2—2 of Figure 1 and looking in the direction of the arrows;

Figure 3 is a sectional elevational view taken substantially on the line 3—3 of Figure 2 and looking in the direction of the arrows;

Figure 4 is a fragmentary horizontal sectional plan view, with parts broken away, showing the overrunning clutch locked out;

Figure 5 is a partly diagrammatic cross-sectional view of a part of the control mechanism taken substantially on the line 5—5 of Figure 1 and looking in the direction of the arrows;

Figure 6 is an enlarged diametric longitudinal section of the valve-actuating solenoid and adjacent parts;

Figure 7 is a cross section taken substantially on the line 7—7 of Figure 6 and looking in the direction of the arrows;

Figure 8 is a sectional detail taken substantially on the line 8—8 of Figure 1 and looking in the direction of the arrows;

Figures 9 and 10 are sectional details taken substantially on the line 9—9 of Figure 8 and looking in the direction of the arrows, showing the parts in different operative positions;

Figure 11 is a cross section taken substantially on the line 11—11 of Figure 2 and looking in the direction of the arrows;

Figure 12 is a view partly in section and partly in side elevation of a part of the control means and the steering column by which it is carried;

Figure 13 is a view similar to Figure 12, certain electrical switching parts of the control mechanism being shown in a different operative position and illustrated in elevation rather than in section;

Figures 14 and 15 are cross-sectional views taken substantially on the line 14—14 of Figure 12 and looking in the direction of the arrows, showing parts of the electrical switching means in different operative positions;

Figure 16 is a detailed perspective view of the movable element of the switching mechanism;

Figure 17 is a developed sectional view of the fixed contact of the switching mechanism, taken substantially on the line 17—17 of Figure 15 and looking in the direction of the arrows;

Figure 18 (Sheet 2) is a fragmentary elevational view, partly broken away, taken substantially as indicated by the line and arrows 18—18 of Figure 12;

Figure 19 is a sectional detail of a part of the second and high gear shifting mechanism showing the parts in the positions they occupy during conventional high-gear drive;

Figure 20 is a view similar to Figure 19 but showing the parts positioned for freewheeling drive; and Figure 21 is a view similar to Figure 17, showing a somewhat modified construction.

Referring now to the drawings, reference character 20 designates generally the case of a transmission, the arrangement and construction of which are indicated as following conventional automotive practices and the function of which is to vary the torque and gear ratio or drive connection between the crankshaft 22 of the engine 24 and the transmission output shaft 25. The engine may of course be of any suitable or conventional type, and the same is true of most of the components of the transmission and its shifting mechanism. They will accordingly be described only to the extent required for a full comprehension of the invention and to show the applicability of the invention to such known mechanisms.

The transmission drive gear 26 is drivable in the usual manner through a friction clutch, generally designated 28, the clutch being disengageable at will by means of a foot pedal 30. The transmission is depicted as incorporating a conventional countershaft gear cluster generally designated 32, including a main countershaft gear 34 and second-speed and low-speed countershaft gears designated 35 and 36 respectively. The low and reverse main shaft gear 38 is selectively slidable from the neutral position in which it is shown in Figure 2 to engage either the first-speed countershaft gear 36 or the reverse idler gear 40, which meshes with the gear 41 on the countershaft, in the usual manner, while the second-speed gears 35, 42 are of the constant mesh type, second speed and direct drive being controllable by the second and high-gear sliding clutch element 44. It will be seen that by selective sliding of the low and reverse main-shaft gear 38 and the second and high main-shaft sliding clutch 44, the transmission main shaft 45 may be driven at any selected ratio in the usual manner.

Between the transmission main shaft 45 and the output shaft 25, which is adapted to be connected to the final drive of the vehicle in the usual or any other suitable manner, an overrunning clutch, shown as of the graduated roller type, is interposed. The hub portion of the overrunning clutch, designated 46, constitutes the driver and is keyed to the transmission main shaft. The rollers are generally designated 48, and the cupped driven member 50 is keyed to the output shaft 25, as shown in Figures 2 and 4. The overrunning clutch is constructed to permit the output shaft to turn faster than the transmission main shaft in the usual manner, but is locked out to provide a positive two-way drive when the shiftable transmission elements 38—44 are fully moved to any of the several conventional driving positions in the normal manner. Crown clutch teeth designated 52 are formed upon the free front edge of the overrunning clutch-driven member 50 and are adapted to be interengaged by conforming teeth 54 formed upon slidable lock-out clutch member 56 splined upon the main shaft 45 and actuatable by a shifting fork 58.

Conventionally arranged shifting forks 60, 62 are also provided to shift the low and reverse gear 48 and the second and high gear sliding clutch 44 respectively. Shifting forks 58, 60, and 62 are actuable by shifting lever means generally designated 64, 65 and 66 respectively. Lever assemblies 65 and 66 are so constructed and arranged as to provide yieldable force-transmitting means between the hand-control lever 112 and the shiftable elements of the transmission as hereinafter brought out. Shift lever 64 is fast upon the outwardly projecting extremity of a shaft 68 projecting into the transmission case and carrying upon its inner extremity within the case an arm 70 which supports and serves to actuate the fork 58. Shaft 68 is journaled in bearing boss portions as 72 carried by and shown as formed integrally with the cover 74. All of the shifting mechanism directly associated with the transmission will be seen to be supported by and removable with the cover.

A vacuum-type servo motor, the cylinder of which is generally designated 75, is provided to actuate the shift lever 64 and so to move the lock-out clutch member 56 to and from the released and the lock-out positions, which positions are respectively shown in Figures 2 and 4. The servo motor may be of one of the commercially available types or of any suitable variety, being shown as incorporating a slidable piston assembly 76 attached to a rod 78 projecting from the cylinder and pivoted to the lever 64 by a pin 80. This connection serves as one of the supports for the entire servo motor assembly, its front support being formed by a hanger bracket 82 attached to the transmission case by two of the screws 73 which are also employed to secure the cover 74. A U-bracket 84 rigidly secured to the forward end of the cylinder 75 and projecting substantially axially therefrom forms a clevis for pivotal connection of the cylinder to the bracket 82, the arms of clevis bracket 84 embracing the bracket 82 and these parts being transfixed by a pivot pin 85. Piston assembly 76 is urged inwardly of the cylinder by a coiled compression spring, shown as of the helico-spiral type, designated 86, trapped on the piston rod between the piston assembly 76 and the rear cylinder head 77. Spring 86 normally maintains the piston and rod assembly 76—78 in a position which holds the lock-out clutch element 56 in the engaged position shown in Figure 4.

The engine 24 is indicated as of the variety having an intake manifold 88 within which the pressure is normally below atmospheric at all times while the engine is running, and a solenoid-operated valve, the casing of which is generally designated 90, is provided, connected to the manifold as by the tube 92 and adapted, when opened, to establish communication between the manifold and the rear end of the cylinder 75. The forward end of the cylinder is continuously connected to atmosphere as by the vent means 79 so that, when the solenoid-operated valve is open, atmospheric pressure forces the piston rearwardly, or to the right as viewed in Figure 1, to release the lock-out clutch element and render the overrunning clutch assembly operative.

Within the valve casing 90 is a valve member 94 normally held against a valve seat portion 95 formed in the valve case cover 96, and thereby closing off the line 92 to the intake manifold. The valve chamber 98 below the seat is connected by a port 100 to the interior of the cylinder 75. The valve stem 102 is integral with an armature 104 actuatable by the solenoid 105, the armature being urged upwardly by a helical compression spring arranged beneath and housed partly within the same and the valve being thus yieldably held in the closed position, but adapted to be opened when the solenoid is energized. The solenoid is housed in a canlike container 106, depending from the bottom of the valve casing, the solenoid housing, as well as the rear extremity of the cylinder 75 and the space under the valve 94, being vented by means of a port 108 and a filter assembly 110 when the valve is closed. It will be seen that when the valve is opened it is pulled down against a seat 93 formed in the lower end of the chamber 98 to isolate the servo motor system from the vent.

The transmission control mechanism may be and preferably is conventional in its general arrangement and operation and includes a manually operable control lever 112 supported by the steering post or column 114 in a position convenient to the driver. The lever is rigidly attached to a rod 115 which extends downwardly beside the steering column to a position within the engine compartment, where it carries a cross pin 116. The cross pin 116 is movable longitudinally of the steering column when the control lever is moved up or down. When in its up position, the cross pin fits in a diametric slot 118 formed in the lower end of the hub portion 120' of a lever 120 loosely journaled on the rod 115, the cross pin being then entirely clear of a corresponding, oppositely facing slot 122 formed in the abutting upper end of the hub 121' of an adjacent lever 121, similarly loosely journaled upon the rod. The slotted hub portions of the levers closely abut one another, as best shown in Figure 18, and the slots are aligned with one another when the levers are in the neutral position, so that the pin may then pass from one to the other.

The rod-and-cross-pin assembly 115, 116 is so controlled that the pin cannot be moved from one to another of the slots 118, 122, except when the levers 120, 121 are in the neutral position. The controlling means is indicated as comprising a boxlike casing 125 attached to the steering column and serving to house the inner extremity of the lever 112. Casing 125 is provided with a generally cylindrical outer wall within which a substantially H-shaped guide slot 126 is formed, the guide slot corresponding to the desired shifting movement of the control lever which, by reference to Figure 1, will be seen to be depicted as conventional in character. The control lever is shown as comprising a bell crank having an arm 113 integral with the main lever arm 112 and traveling in the slot 126.

Lever 120 is connected to and serves to actuate the low and reverse shifter fork 60, although its connection thereto is yieldable in character to accommodate limited relative force-transmitting movement of the hand-control lever 112 with respect to the shifter fork for reasons to hereinafter become apparent. Lever 120 is connected by means of a link 130 to a lever 132, forming a part of the lever assembly 65 and loosely pivoted upon the projecting extremity of the shaft 134. Shaft 134 also carries lever 138 fast upon its outer end and is journaled in the cover 74 similarly to the shaft 68. Within the transmission case, shaft 134 supports the arm 136 which carries the shifter fork 60. Fork 60 is mounted similarly to the shifter forks 58, 62, having a stub shaft portion 61 journaled in and carried by arm 136. The lever 132 tends to rock the shifter fork in the angular direction determined by movement of the control lever, and the yoke is yieldably urged toward a predetermined angular position with respect to lever 132 by means best shown in Figures 8, 9, and 10. Lever 138 lies beside but is shorter than the lever 132, and the lower extremity of lever 138 is provided with a flat transverse surface 139 perpendicular to the lever. A plunger 140 having a flat head 142 is urged against the surface 139 by a spring 144. This arrangement serves as a centering device tending to maintain levers 132, 138 parallel to one another. The body or stem portion of the plunger 140 is slidably fitted in a socket 145 formed integrally with the lever 132 and projecting from the outer face thereof in alignment with the lever 138, the spring 144, of the compression type, being trapped within the socket under the stem of the plunger. Downward movement of the plunger is limited by engagement between the underside of its head 142 and the top of the socket portion 144. It will be noted from Figure 10 that such engagement occurs when the levers 132, 138 have rocked to a relatively small angle with relation to one another, and this represents the limit of their relative angular shifting movement. Since the surface 139 of lever 138 and the top of the plunger 142 are flat and perpendicular to the respective levers by which they are carried, the plunger serves as a cam tending to maintain the levers in alignment with one another and returning them to such relation but accommodating limited yieldable angular displacement of one with respect to the other. Lever 138 is indicated as fastened to the extremity of the yoke-actuating shaft 134 by means of a castellated nut 146 which holds the lever upon the flattened extremity 148 of the shaft, the lever being formed with a conformably shaped aperture (undesignated) fitting the flattened section.

The normalizing of the yieldable connections 65 or 66 effects the final state of positive gear engagement. If the cycle of manual shifting operation includes the aforesaid normalizing of the yieldable means following manual initial positive gear engagement, then for the yieldable means to normalize itself to accomplish the final stages of positive engagement a much improved operational result is established.

The shift-lever 112 is moved to directly effect the initial engagement of the teeth of the shiftable element and gearing, at which point the manual lever has completed its stroke; then the spring 144 in the operative yieldable connection normalizes to its prestressed condition to effect the completion of the positive engagement. This cycle of shifting sequence provides for the added power of the hand to get the teeth started into engagement, and then the spring 144 only has to perform the lesser effort to complete the meshing of the gear teeth.

It is to be appreciated, however, that the aforementioned functioning of the force-transmitting connections 65, 66 is effective, providing sufficient "drag-torque" is present in the gearing during shifting thereof; i. e., manual force acting through said connections after taking up the relative movement is directly applied to effect initial meshing of the selected gearset, and the continued movement of the slidable gearset element to full meshed condition is effected by the normalizing of the connections 65, 66 in restoring the relative movement condition thereof, and the shift-lever 112 operating to its full shifting stroke. If minimum "drag-torque" is present at the moment of effecting a change in speed drive by the shift-lever 112, under such conditions the lever would move relatively to the torque-loaded element of the gearset to cause automatic relief of torque while applying a shifting force thereagainst, and upon torque relief the slidable element of the selected gearset would be acted on directly to initially engage the same. At this point the relative movement would be instantly restored by the spring 144 of the force-transmitting connection to carry the slidable element farther into mesh, and continued operation of the aforesaid shifting force to its full shifting stroke would act through the spring 144 of the operative connection 65 or 66 to complete the meshing of the selected gearset, thus rendering operative the corresponding speed drive of the gearing.

The operative connection between lever 121 and the second and high-speed sliding clutch-shifting lever 66 and its connected yoke 62 preferably conforms to the connecting means just described for operation of the yoke 60, and corresponding parts are designated by reference characters which are corresponding but twenty integers higher. It will be seen that these parts require no detailed redescription and that when lever 124 is rocked by the control lever 112, it yieldably urges the clutch element 44 in the corresponding direction. The shifting means for the gear 38 and clutch 44 may also be yieldably held in position by ball detent means of generally conventional form acting upon the yoke-supporting arms as 136, and which may comprise spring-pressed balls as 131, yieldably urged into notches as 137 formed in sector plate portions as 141, 161 carried by and shown as formed integrally with the arms.

At its lower extremity the rod 115 is supported in and guided by a bracket assembly generally designated 170 secured to the steering column 114 as by the clamping straps 172 and clamping bolts 174. Bearing bracket portions 176, 178 projecting outwardly from the bracket assembly 170 lie upon opposite sides of and close to the hub portions 120', 121' of the levers 120, 121, to hold these parts against longitudinal movement along the rod, the rod projecting slidably and rotatably through and below the bearing bracket portions and into a controller switch housing 180 which may, as indicated, be formed integrally with the bearing bracket portions 178. Fast upon the lower end of the rod within the switch housing is a generally cylindrical controller switch body 182 secured to the reduced end of the rod by a cross pin 184. Switch body 182 also serves as an abutment for a helical compression spring 185 urging the rod 115 downwardly and also housed within the casing 180. The switch body 182 is formed of insulating material and provided near its lower end with a bore 186 extending substantially diametrically therethrough but open at one end only. A contact plunger 188 is radially slidable in the bore 186 but held against rotation therein by a cross pin 190 projecting laterally therefrom and adapted to slidably travel in a slot 192 formed in the switch body 182 and diametrically intersecting the bore 186. Plunger 188 is urged upwardly by a helical compression spring 194 trapped beneath it in the bore 186. A contact point element of rounded knife-edge form, designated 195, is carried by the outer extremity of the plunger 188, which also supports a flat connector strip 196. Connector strip 196 is electrically connected to the contact 195, extends downwardly beside the switch body 182, and projects radially inwardly below the latter, carrying a pad portion 198 substantially aligned with the axis of the assembly. An axially slidable brush 200 is urged against the bottom of the pad 198 by means of a coil connector spring 202 housed in a substantially cylindrical boss 204 extending downwardly in axial position from the cap 205 which closes the lower extremity of the switch casing. The boss 204 opens into the interior of the casing and is provided with a conductive liner cup 206, the outer extremity of which carries a connector terminal 208 to which the conductor 210 is connected. The cap 205 is formed of insulating material and a cylindrical insulating liner 212 is also provided within the switch casing 180.

Secured to the inner face of the casing liner 212 is a contact plate 214 adapted to be wiped by the contact point 195 and the developed configuration of which may be as indicated in Figure 17. The inner surface of the contact plate is preferably flush with the inner surface of the liner so that the contact member 195 may slide freely to and from the surface of the plate. Electrical connection to the plate is made by means of an insulated terminal 215 and a conductor 216. The terminal 215, of the screw type, also serves as a mechanical securing element for the contact plate 214.

The proportions and configuration of the plate 214 are such that when the control lever 112 is moved all the way to any one of the positions corresponding to full driving engagement of the clutch 44 or sliding gear 38, the contact point 195 lies free of the edge of the contact plate 214, bearing only against the insulating casing liner 212, so that electrical connection between the terminals 208, 215 is interrupted. Conductor 216 is connected to one terminal as 218 of the solenoid 105, the other terminal of which is grounded, as indicated at 220. Conductor 210 is connected through a switch 222 to the battery 224, the other terminal of which is grounded, as indicated at 225. It will thus be apparent that the solenoid 105 is energized at all times except when the control lever 112 is in a position corresponding to full engagement of one of the driving gear ratios. With the solenoid 105 de-energized, the valve 94 remains closed and the toothed clutch member 56 is held in position to lock out the overrunning clutch by the spring 86 in the servomotor.

Freewheeling-drive and operation

In order to provide a freewheeling high-gear drive, means may be provided for disengaging the lock-up clutch parts 52, 54 when the transmission is in high gear and the engine is running. This drive is instituted by moving the control lever to a position designated F in Figures 1, 17 and 19. In such position the second and high gear sliding clutch 44, while not fully meshed with the driving clutch teeth 27, is interengaged therewith sufficiently to provide direct drive to the main shaft 45, while contact member 195 remains in engagement with the contact plate 214 so that the lock-out clutch is held disengaged so long as the engine is running. The high gear clutch-driving teeth 27, which may be formed integrally with the transmission gear 26 in the conventional manner, are indicated as somewhat elongated to provide adequate clutch tooth engagement in the freewheeling position. In the freewheeling position the shift lever is in effect moved slightly back from or to a position just short of the full high-gear position, where it is releasably retained by engagement of the detent ball 139 (Figure 3) with a special notch 137F formed in the detent sector 161. The travel of the sliding clutch member 44 and the length of the internal teeth thereof are of course adequate to provide sufficient driving engagement when the teeth are thus partially engaged as noted above, the positioning of the parts when in this freewheeling position being depicted in Figure 20. When the control lever 112 is moved all the way to the high-speed position denominated H in Figures 1, 17 and 21, the sliding clutch element 44 is moved into full engagement with driving tooth portion 27 and contact element 195 is free of contact plate 214. The lock-up clutch member 56 is therefore held in engaged position and the transmission provides a conventional two-way direct drive.

With the transmission in the freewheeling position, if the engine stalls, the pressure rises in the intake manifold and accordingly in the rear chamber of the servomotor, and the lock-up clutch element 56 is moved to lock-up position by the spring 86. If the car is in motion the engine is accordingly cranked and normally restarted by the rear wheels; while, if the car has been brought to a full stop in the stalled condition, full two-way engine braking is resultantly provided. This also provides an important safety feature when the car is parked with the engine stopped, since the overrunning clutch is automatically locked up regardless of the position of the control lever and the engine resists any tendency of the car to roll down an incline even if the control lever is left in or moved to the freewheeling position.

Normal positive-drive operation

Further considering the operation of such a transmission equipped with my improved control mechanism, it will be noted that in starting the car from a standing position, the action of the parts is entirely conventional. The engine clutch 28 is released by means of the foot pedal 30, and the sliding gear 38 is moved into the low-speed position in the conventional manner. The lock-out clutch member 56 is momentarily disengaged, as during the movement of the control lever to the low-speed position the contact member 195 passes over the contact plate 214, but this has no effect upon the operation of the vehicle. When, with the car in motion, it is desired to shift from low to second speed, it is not necessary to disengage the clutch 28. The driver merely allows the engine to throttle down, as by releasing the accelerator pedal in the conventional manner, and moves the control lever 112 to the second-speed position. Regardless of the torque load upon the transmission parts, the initial movement of the hand lever required to move contact 195 to engagement with plate 214 is accommodated by the flexible shifting connection between the actuating levers 132, 138. The lock-out clutch member 56 is thereupon immediately freed, allowing the propeller shaft to overrun the transmission main shaft, releasing the load upon the transmission parts and facilitating movement of the sliding gear 38 and sliding clutch 44 to any selected position. Ordinarily this will of course involve moving gear 38 to the neutral position and clutch 44 to the second-speed position in which its internal teeth engage the driving clutch teeth 43 of second-speed gear 42. During movement of the hand lever from the neutral to the second-speed position, the solenoid remains energized, but it is de-energized as the fully engaged second-speed position is reached. The lock-out clutch is accordingly again moved to engaged position, reestablishing conventional two-way drive. The action is similar in shifting from second speed to direct drive, in that the initial movement of the hand lever away from second-speed position as provided by the limited flexing means incorporated in lever assembly 66 while the gearing is under torque-load closes the solenoid circuit, opening the overrunning clutch lock-out and accommodating free sliding movement of the shifter clutch 44 to the high-speed position without disengaging the clutch 28. If lever 112 is moved to or back to the intermediate freewheeling or F position, however, a freewheeling direct drive is instituted as described above.

It will be noted that regardless of the torque load imposed on the transmission parts, initial movement of the hand lever is always accommodated by the flexible connections incorporated in the lever assemblies 65 and 66 previously described. Since this initial movement opens the overrunning clutch lockout, the torque load upon the parts is relieved by the consequent opening of the lock-out clutch and the throttling of the motor, accommodating free shifting to any speed ratio without disengagement of the engine clutch.

Figure 21 shows a somewhat modified contact plate, designated 214A, having a central portion so contoured that when the hand lever is in the neutral position, the contact member 195 is also disengaged from the contact plate, lying at that time in a slotted or cut-out portion 217. Thus with the engine running and the hand lever standing in the neutral position, the solenoid is de-energized and the lock-out clutch engaged, but upon initial movement of the hand lever away from the neutral position the contact is made and the lock-out clutch disengaged during shifting, so that the operation of the modified embodiment is in other respects similar to that of the embodiment first described. In passing through neutral, the instantaneous tendency of the lock-out clutch to re-engage is of course of no significance, since the slidable transmission parts are then free of one another. With this modified arrangement, all portions of the mechanism normally stand and function in the same manner as do the equivalent parts of conventional transmissions and shifting mechanisms, except during the actual shifting operation.

If synchronizing means is incorporated, coacting with shifting clutch 44, as is common transmission practice, the blocking action of such synchronizing means does not interfere with movement of the hand lever and resultant actuation of the lock-out clutch means by the servo motor, since the flexible connections above described always provide sufficient movement of the hand lever for this purpose. Typical synchronizing clutch means, shown in Figures 2, 19 and 20, comprises a pick-up clutch assembly including a ring 220 splined both internally and externally and forming the hub of the second and high-gear sliding clutch member 44, which is slidably splined thereon and ring 220 being slidable on main shaft 45. A spring-pressed detent ball 222 in the hub ring 220 is urged into a notch 223 interiorly formed in the clutch member 44 when these parts are centered with respect to one another. The extremities of ring 220 carry pick-up clutch rings 224, 225 having frustoconic internal clutch surfaces engageable with co-operating externally formed frusto-conic clutch face portions 226, 227 respectively carried in appropriate positions upon the abutting ends of the high-speed gear toothed clutch hub 27 and the second-speed gear toothed hub 43. The rings 220, 224, 225 are normally centered and the pick-up clutch faces held apart by meandering spring rings 229, 229' interposed between the pick-up clutch rings and the gear clutch portions 27, 43 respectively. Upon movement of sliding clutch 44 to either driving position, however, the appurtenant pick-up clutch faces engage preliminarily in the usual manner to synchronize the toothed driving clutch parts.

It will be apparent that the ratio changing means might be automatic in character rather than of the manual form shown and that other modifications may be introduced without departing from the fair field or the intended scope of the subjoined claims.

I claim as my invention:

1. Controlling means for a power drive system of the variety including a prime mover, a friction clutch, and a change-speed gear transmission incorporating torque transmitting elements shiftable to vary the effective ratio of the drive through the transmission, and including supplemental clutching means for interrupting the drive through the transmission in at least one direction, said system also including shifting means for said shiftable elements movable to and from driving and neutral positions, said controlling means comprising lock-up means for said supplemental clutching means normally maintaining a positive two-directional drive therethrough, a controller directly connected to and responsive to initial movement of the shifting means away from driving position for inactivating said lock-up means.

2. Controlling means for a power-drive system of the variety including a prime mover, a friction clutch, and a change-speed gear transmission incorporating torque-transmitting elements shiftable to vary the effective ratio of the drive through the transmission and including supplemental overrunning clutch means for interrupting the drive in one direction, a shifting member connected to said shiftable elements by a yieldable force-transmitting connection and operable therethrough to actuate said elements, said connection operably defining limited relative movement between said member and elements, said controlling means comprising a releasable lock-up clutch for said overrunning clutch means normally maintaining a positive two-directional drive through the latter, and a controller connected to and responsive to said relative movement of the shifting member for controlling said lock-up clutch to and from released and lock-up positions.

3. Means as set forth in claim 2 wherein said shifting member comprises a handle connected to said controller and having limited yieldable relative movement with respect to the shiftable elements.

4. In combination with a change speed gear transmission incorporating elements shiftable to change the driving ratio of the transmission and including an overrunning clutch, lock-up means for the overrunning clutch, control means movable to different driving positions for shifting said elements to establish different driving ratios, means comprising a controller actuatable by movement of the control means for disengaging said lock-up means during such movement and for engaging the lock-up means when the control means is moved to each of said driving positions, said controller having a portion responsive to movement of said control means to another position to maintain one of said driving ratios effective while disengaging said lock-up means, thereby establishing a freewheeling drive.

5. In a change speed gear transmission having torque-transmitting elements one of which is slidable to and from interengaged relation with another to vary the transmission ratio, an overrunning clutch adapted to provide a freewheeling drive, transmission control means including a control handle movable to slide one of said elements to and from interengaged relation with another, lock-out means for said overrunning clutch, and means including a controller actuatable to engage and disengage said lock-out means in response to partial movement of said control handle to a degree insufficient to fully engage or disengage said torque-transmitting elements.

6. Means as set forth in claim 5 in which the interengageable parts of said torque-transmitting elements are of such length that the control handle is selectively actuatable through sufficient travel to actuate the lock-out means while said elements remain interengaged.

7. Controlling means for a power drive system of the variety including a prime mover, a friction clutch, and a change-speed gear transmission incorporating torque transmitting elements shiftable to vary the effective ratio of the drive through the transmission, and including supplemental clutching means for interrupting the drive through the transmission in at least one direction, said system also including manually operable means yieldably connected to said shiftable elements, and controlling means comprising lock-up means for said supplemental clutching means normally maintaining a positive two-directional drive therethrough, and means responsive to initial movement of said manually operable means and actuatable during relative movement between said shifting means and said shiftable elements for inactivating said lock-up means.

8. Controlling means for a power drive system of the variety including a prime mover and a change-speed gear transmission incorporating torque transmitting elements shiftable to vary the effective ratio of the drive through the transmission, and including clutching means for interrupting the drive through the transmission in at least one direction, said system also including shifting means for said shiftable elements comprising a manually movable shift-lever operatively connected to said shiftable elements to shift the same, the connection of said shift-lever to said elements accommodating limited relative movement therebetween, lock-up means for said clutching means normally maintaining a positive two-directional drive through said clutching means, and means including a controller directly responsive to initial movement of said shift-lever and actuated during said relative movement between said shift-lever and shifting elements for inactivating said lock-up means.

9. Controlling means for a vehicular power-drive system of the variety including a prime mover, a vehicle clutch, and a change-speed transmission incorporating torque-transmitting elements shiftable to vary the effective ratio of the drive through the transmission, and including supplemental clutching means for rendering the drive ineffective in at least one direction, said system also including shifting means for said shiftable elements and for engaging and disengaging said supplemental clutching means, and a movable control member for actuating said shifting elements, yieldable force-transmitting means connecting said control member and the shifting means for said shifting elements, energizable motor means operable for actuating said shifting means for the supplemental clutching means, energizing means for said motor means, and means directly responsive to initial non-shifting movement of said control member and actuated during further non-shifting relative movement of said control member with respect to said shifting means for controlling said motor means prior to actual shifting of said shifting elements.

10. Controlling means as defined in claim 9 for a system wherein said prime mover includes a portion within which fluid pressure variances occur during operation, said motor means being selectively connectable to and operable by pressure variances within said portion of the prime mover, electrically operable means for controlling the connection of said motor to said portion of the prime mover, and said means actuatable during said relative movement of said control member being effective to control the action of said electrically operable means.

11. Means as set forth in claim 8 wherein said controller comprises an electric switch connected to said control member, and a motor controlled by said switch for functioning as said controller to inactivate the lock-up means.

12. In controlling means for a power drive system of the type including a prime mover, a change-speed gear transmission incorporating torque-transmitting elements shiftable to vary the effective ratio of the drive through the transmission, clutch means engageable to transfer torque through the transmission and disengageable to interrupt torque transferal therethrough in at least one direction, a manually actuatable shift-lever, energizable motor means operable for actuating said clutch means to disengage the same, energizing means for said motor means, yieldable force-transmitting means operably connecting said shift-lever to said shiftable elements and accommodating limited relative movement therebetween, and means directly responsive to initiation of shift-lever movement and effective during said limited relative movement of said shift-lever and said shiftable elements for energizing said motor means prior to shifting movement of said shiftable elements.

13. Means as set forth in claim 12 wherein the last-mentioned means comprises an electric circuit including a source of electric current, a fixed connector plate, a contact element movable with said lever into and out of contact with said plate, and electrically operable control means for energizing said motor means when said element and said plate are in contact.

14. Controlling means for a power drive system of the variety including a prime-mover and a change-speed gear transmission incorporating torque transmitting elements shiftable to vary the effective ratio of the drive through the transmission, and including clutching means for interrupting the drive through the transmission in at least one direction, said system also including shifting means comprising a handle mechanically connected to said shiftable elements and manually operable to shift the same, lock-up means for said clutching means normally maintaining a positive two-directional drive through said clutching means, means including a controller responsive to movement of the handle for inactivating said lock-up means, said handle being movable to a neutral position or to any of various other positions to establish different driving ratios, force-transmitting means connecting said handle and said shiftable elements including a pair of elements having yieldable relative motion connection with one another, and means for actuating said clutching means comprising a controller directly actuatable in response to movement of said handle and without regard to the position of said shiftable elements.

15. Means as set forth in claim 1 in which said shifting means includes a manually actuatable handle to which the controller is directly connected, and coupling elements having yieldable relative motion connection with one another and yieldably connecting said handle and controller to said shiftable elements.

16. In combination with a change-speed gear transmission incorporating elements shiftable to change the driving ratio of the transmission and including an overrunning clutch, a lock-up clutch for the overrunning clutch, and common control means for the shiftable elements and the lock-up clutch comprising a manually actuatable handle having yieldable relative motion connection with the shiftable elements and a controller for the lock-up clutch actuatable during relative movement of the handle accommodated by such relative motion connection.

17. Means as set forth in claim 14 wherein said controller comprises an electric switch connected to said handle, and a motor controlled by the switch for activating and inactivating the lock-up means.

GLENN T. RANDOL.

REFERENCES CITED

The following references are of record in the file of this patent:

UNITED STATES PATENTS

| Number | Name | Date |
|---|---|---|
| 1,856,189 | Johnson | May 3, 1932 |
| 1,900,096 | Bushong | Mar. 7, 1933 |
| 1,916,891 | Padgett | July 4, 1933 |
| 2,087,643 | Gillett | July 20, 1937 |
| 2,163,883 | Kliesrath | June 27, 1939 |
| 2,163,891 | Sanford | June 27, 1939 |
| 2,238,133 | Sanford | Apr. 15, 1941 |
| 2,251,342 | Ranen | Aug. 5, 1941 |
| 2,255,738 | Barkeij | Sept. 9, 1941 |